Dec. 1, 1925.
G. L. SMITH
1,564,029
SUSPENSION DEVICE
Filed July 27, 1925      2 Sheets-Sheet 1
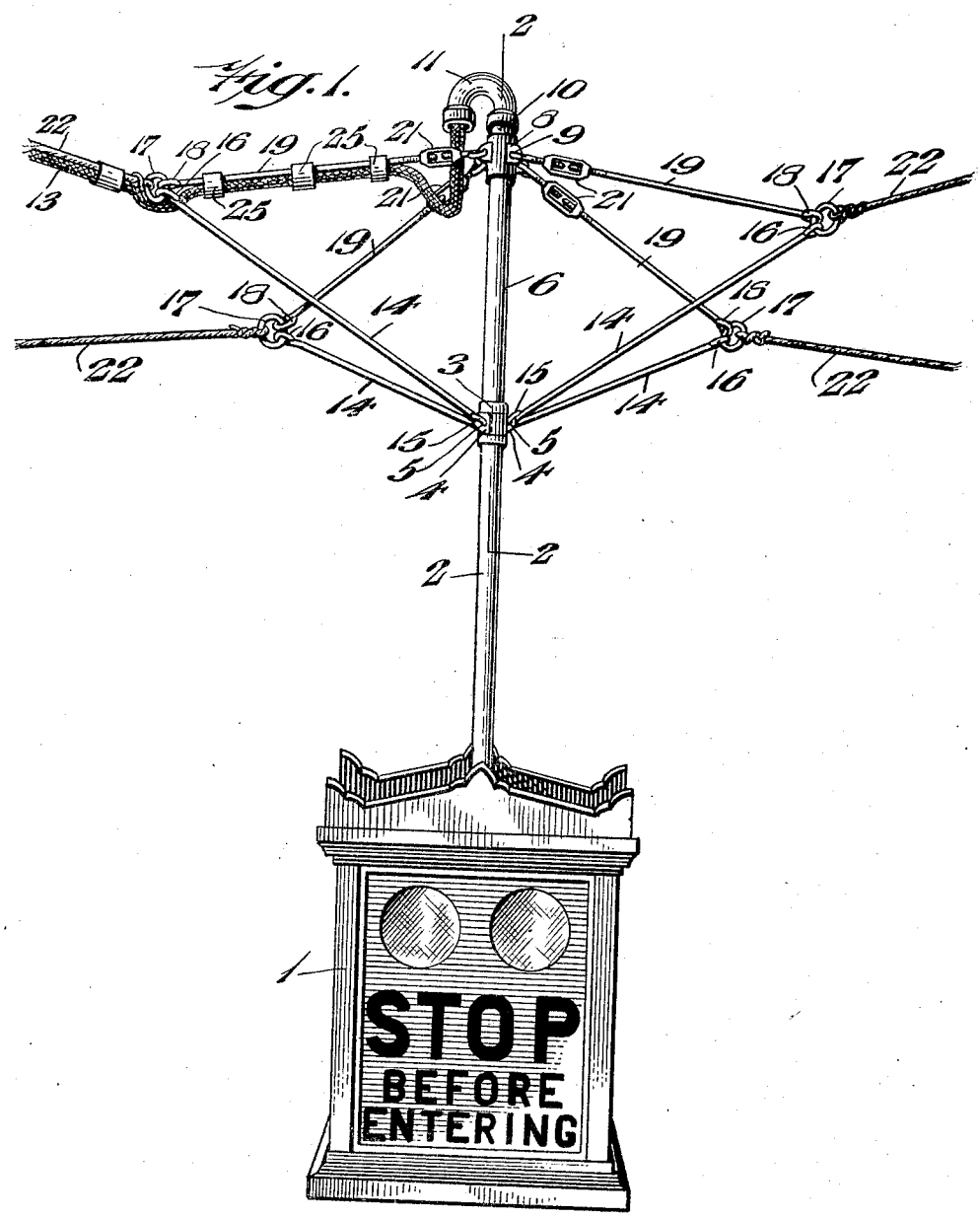

Dec. 1, 1925.
G. L. SMITH
1,564,029
SUSPENSION DEVICE
Filed July 27, 1925 2 Sheets-Sheet 2
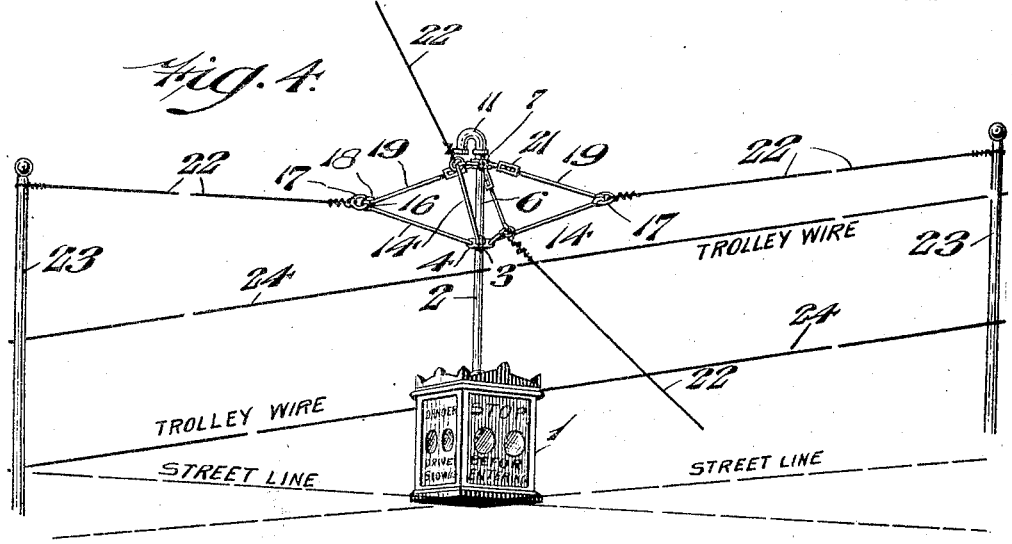
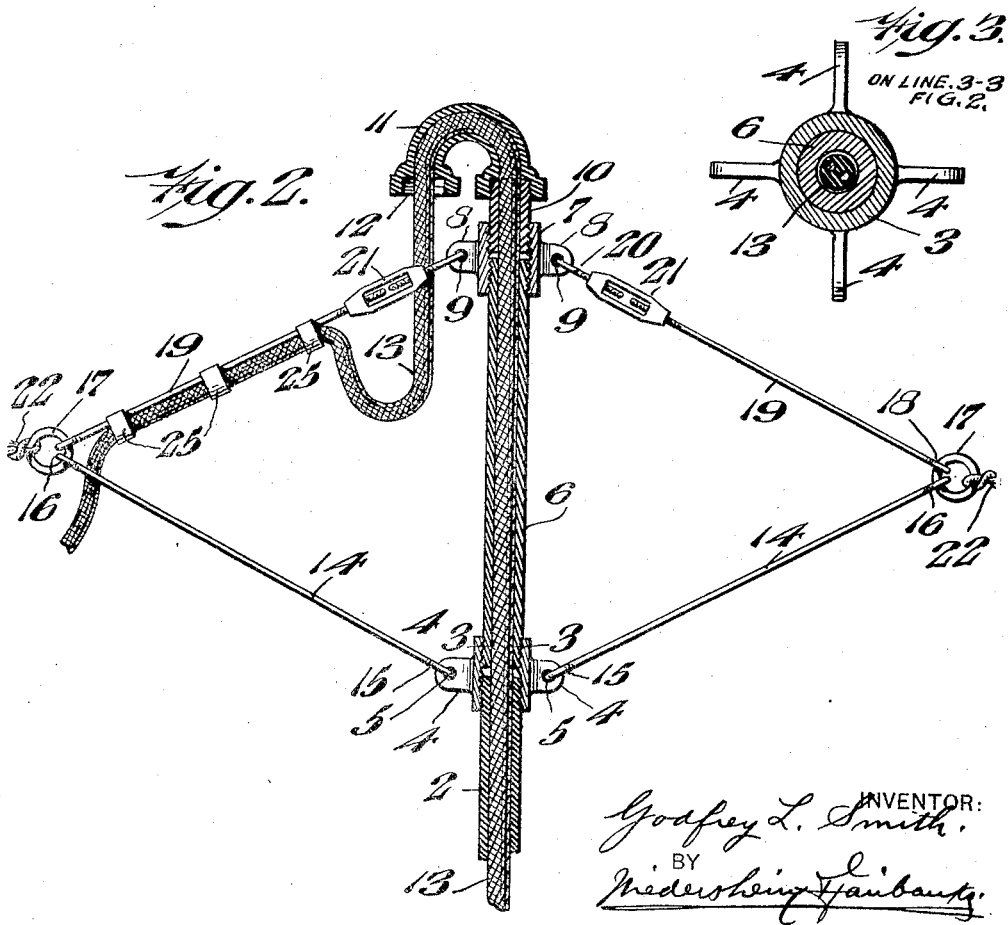

Patented Dec. 1, 1925.

1,564,029

UNITED STATES PATENT OFFICE.

GODFREY LEWIS SMITH, OF NEWPORT NEWS, VIRGINIA, ASSIGNOR TO NEWPORT NEWS SHIPBUILDING AND DRY DOCK COMPANY, OF NEWPORT NEWS, VIRGINIA, A CORPORATION OF VIRGINIA.

SUSPENSION DEVICE.

Application filed July 27, 1925. Serial No. 46,506.

*To all whom it may concern:*

Be it known that I, GODFREY LEWIS SMITH, a citizen of the United States, residing at Newport News, in the county of Warwick and State of Virginia, have invented a certain new and useful Suspension Device, of which the following is a specification.

My invention relates to a novel suspension or support applicable primarily to all kinds of traffic or other signals or signs, whether fixed or moving, illuminated or non-illuminated, electrically or mechanically operated, means being provided for supporting such signals, signs or the like from points above the ground or street level, thus avoiding the creation by the signal or sign of an objectionable obstruction to vehicular or pedestrian traffic, and at the same time permitting the signal or sign to be so positioned as to be clear of any vehicular load and also within the range of vision of pedestrians and of drivers of vehicles, irrespective of the height of the point to which the means of suspension is attached, it being understood that my invention, while designed primarily for the general purposes above described, is equally applicable to the suspension of advertising or other signs, to street lights, and to railroad or other signals or signs or similar devices where a ground installation is either impracticable or objectionable.

My novel suspension device in its broad aspects is applicable to any sort of a signal or sign or any device of this general character, which requires a supporting means above the ground or street level, the invention being obviously adaptable for street lights and the suspension of devices generally as well as other purposes.

It further consists of a novel construction of a suspension device, combined with a support composed of non-rigid members between the poles or walls and the signal, sign or other device, it being apparent that fixation of position both vertically and horizontally is attained by the tension alone on the bridles or supporting wires or cables or their equivalents.

It further consists of a novel construction of a central upright hollow supporting member, which is composed of tubular sections having a fitting common thereto, there being a U-shaped upper fixture positioned at the top of said central support, whereby an elongated conduit is provided for the electrical connections leading to the signal, sign, lamp or the like, the contour of said upper fixture being such, that there is no liability of rain, snow, moisture or the elements having access to said hollow support and interfering with the operation of the electrical connections.

It further consists of a central, tubular upright supporting member, combined with upper and lower bridles, the outer ends of which latter are secured to a common ring or similar fastening device from which extend the guy ropes to the supporting poles or walls, whereby the device is supported under tension and is steadied and secured against excessive and objectionable swaying, which would occur were all the cables run directly to either of the fittings.

It further consists of other novel features of construction and advantage all as will be hereinafter fully pointed out and claimed.

For the purpose of illustrating my invention, I have shown in the accompanying drawings forms thereof which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1, represents a perspective view of a novel suspension device, embodying my invention.

Figure 2, represents on an enlarged scale, a vertical sectional view, on line 2—2, Figure 1, certain of the parts being shown in elevation.

Figure 3, represents on an enlarged scale, a section, on line 3—3 Figure 2.

Figure 4, represents on a reduced scale a perspective view of my novel device, showing the supporting poles and its relative position to a pair of intersecting streets.

Similar numerals of reference indicate corresponding parts.

1 designates a signal, sign or other device to be supported, the top of which is provided with a suitable socket, into which is screwed or pinned the pipe 2, which may be of any suitable length so as to position the signal, sign or other device to be supported at the desired height with reference to the ground or roadway. 3 designates a threaded or socketed fitting into which the upper end of the pipe 2 is secured, said fitting being provided around its periphery with a plurality of lugs 4, which are provided with the holes or eyes 5. 6 designates an upper section of tubing or pipe, preferably of the same diameter, as the lower section 2 and having its lower end threaded or otherwise secured to the upper end of the fixture or coupling 3. The upper end of the tube or spreader pipe 6 is threaded or otherwise secured to the lower end of the fitting 7 which is similar to the fitting 3 and provided with the lugs 8 having the eyes 9 therein, said fittings 3 and 7 being duplicates. 10 designates a nipple whose lower end is threaded or otherwise secured to the upper end of the fitting 7, the upper end of said nipple being threaded or otherwise secured to one end of the U-shaped upper fitting 11, through whose open end is inserted the electric wires or conductors or other means for lighting or actuating the signal, sign or other device 1. The pipe sections 2, 6 and 10 and the fittings 3, 7 and 11 when assembled form a rigid unitary structure, which now amply serves as an effective enclosure for the conductor 13, since the fitting 11 prevents entrance of water or moisture to the major portion of said conductor, but also serves as a sturdy and effective supporting and adjusting means for the signal, sign or other device 1, as will now be explained. 14 designates the lower bridle rods or cables, whose lower or inner ends are provided with eyes 15 which engage or pass through the eyes 5 of the lugs 4. The upper or outer ends of the bridle rods 14 are provided with eyes 16, which are united by means of rings, shackles lashings or the like 17, with the eyes 18 at the lower ends of the upper bridle rods or cables 19, which are provided at their upper or inner ends with eyes 20, which are passed through or secured to the eyes 9 of the upper lugs 8. The upper bridle rods 19 are made in two sections in which are interposed the turnbuckles 21, whereby the lengths of the upper bridle rods 19 can be adjusted independently one of the other, thus securing the verticality of the pipe sections 2 and 6, and hence of the signal or sign 1. 22 designates the guy wires, cables or rods forming the means of positioning the signal or sign 1, in plan and of supporting its weight, each of said cables having one end attached to the rings 17 or the outer eyed ends of the bridles 14 and 19, while their other or outer ends are attached to a pole, wall or other support 23, said guy wires 22 being put in tension to an amount suited to the weight of the signal or sign 1, and to the surrounding structures.

It will be understood that the object of the spreader 6 and bridles 14 and 19, is to steady and secure the device 1, against the excessive and objectionable swaying, which would occur if the cables 22 were all run directly to either of the fittings 3 or 7, which result is effectively attained in practice by my device. The steadying effect is increased in proportion, as the length of the bridles 14 and 19 is increased, up to the point where each bridle becomes a pair of guys, running from the pole or other support direct to the lugs on the fittings 3 and 7, the proper length of said bridles being determined, by considerations of economy and ease of installation.

As illustrating one of the practical applications of my invention, Figure 4 shows the same signal as that in Figure 1, with the guy wires 22 passing clear over the top of a pair of trolley wires 24, and the signal or sign 1 extending well below the trolley wires. The safe passage of the trolley poles and of the cars is thus assured, and at the same time the signal or sign is at such a height as to clear loaded trucks passing beneath it and as to be plainly visible to both drivers of vehicles and to pedestrians. The particular signal shown is intended to warn the driver on the street on which the trolley line is located, that he is approaching an intersection with a principal thoroughfare and that he must come to a full stop before crossing it. If the principal thoroughfare is that on which the trolley lines are located, the signal would be disposed at right angles to the position as shown in Figure 4. Both sides of the signal or sign may read alike, thus permitting a single signal to operate as a warning to traffic from both directions and thus effecting an economy in the number of signals needed at an intersection. In case there is a single trolley wire, the signal or sign would be suspended slightly to one side of the trolley wire, if it is in the center of the street.

It is obvious that my novel suspension is well adapted for a signal or sign warning and for directing traffic in four directions. In case the street on which the trolley lines are located is the principal thoroughfare, drivers on that street are warned that there is an intersection requiring cautious driving, and drivers and pedestrians desiring to cross the principal thoroughfare are warned that they must stop before attempting to cross the traffic on the principal thoroughfare on which traffic may have the right of way.

In the assembly of my novel device it will be apparent that the tubular sections 2 and 6 are first assembled with respect to the fitting 3, after which the nipple 10 is screwed into position and the upper U-shaped fitting 11 is threaded upon said nipple and the bridles 14 and 19 are then connected up with respect to the fittings 3 and 7 and their outwardly converging ends united to the rings 17 or their equivalents, after which the guy ropes 22 are secured in position as will be understood from Figure 4. The turn buckles 21 are then adjusted and the guy ropes or cables 22 bring the proper tension upon the bridles. The cable 13 having been threaded into the hollow tubular conduit formed by the members 11, 10, 7, 6, 3 and 2 and the conduit 13 and the signal or the like, the device is then ready for operation.

By the manipulation of the turn buckles 21, the tubular conduit or support composed of the tubes 2 and 6 and their adjuncts can be readily adjusted so as to stand in a vertical position, and it will be apparent that fixation of position both vertically and horizontally is attained by tension alone on the supporting wires or cables. While I have shown in my present invention, the bridles as composed of four branches, it will be apparent that only three of these are necessary for fixing the position of the signal or other devices horizontally. Two of such bridles with cables, wires or rods approximately 180° apart will afford all the vertical support necessary. The third bridle and its adjuncts is essential to prevent lateral displacement or swaying, and it may make any angle with the other two, provided it makes the other two assume an angle with respect to each other of less than 180°. The upper end of the conduit 13 can be supported from one of the bridles 19 by suitable clips 25 as seen in Figures 1 and 2. It will be apparent that my invention can be cheaply constructed and will be found to be effective and durable in operation and can be readily installed without the employment of skilled labor.

Having thus described my invention, what I claim as new and desire to secure by Letters Patent, is:—

1. In a device of the character stated, a tubular support, upper and lower fittings for said support, upper and lower bridle members having their inner ends connected to said fittings and their outer ends converging and secured together and cables extending from the outer converging ends of said bridle members to fixed supporting points.

2. In a device of the character stated, a tubular support, upper and lower fittings for said support, upper and lower bridle members having their inner ends connected to said fittings and their outer ends converging and secured together, cables extending from the outer converging ends of said bridle members to fixed supporting points, and turn buckles interposed in certain of said bridle members for enabling the desired adjustment to be effected.

3. In a device of the character stated, a tubular support, upper and lower fittings for said support, upper and lower bridle members having their inner ends connected to said fittings and their outer ends converging and secured together, cables extending from the outer converging ends of said bridle members to fixed supporting points, and an upper fixture carried by said tubular support and having downwardly turned ends and adapted to have an electric conductor entering said upper fixture and conduit and extending through said tubular support to said signalling device supported therefrom.

4. In a device of the character stated, a tubular support, upper and lower fittings for said support, upper and lower bridle members having their inner ends connected to said fittings and their outer ends converging and secured together, cables extending from the outer converging ends of said bridle members to fixed supporting points and turn buckles interposed in the upper bridle members for enabling the desired adjustment to be effected.

5. In a device of the character stated, a central tubular support, upper and lower fixtures for said support, a nipple secured to the upper end of said support, a U-shaped fitting secured to the top of said nipple, upper and lower bridle members having their inner ends secured to lugs on said upper and lower fittings, the outer ends of said bridle members converging and being secured to a ring, turnbuckles interposed in the upper bridle members, and cables having their inner ends secured to said rings and their outer ends secured to suitable fixed supporting points.

6. In a device of the character stated, a central tubular support. upper and lower duplicate fixtures for said support, each being provided with lugs, oppositely disposed bridles having their inner ends connected to said lugs, rings to which the outer ends of said bridles are connected, fixed supporting points, and cables having their inner ends secured to said rings and their outer ends to said fixed points.

7. In a device of the character stated, a central tubular support, upper and lower duplicate fixtures for said support, each being provided with lugs, oppositely disposed bridles having their inner ends connected to said lugs, rings to which the outer ends of said bridles are connected, fixed supporting points, cables having their inner ends secured to said rings and their outer ends to said fixed points, and means for varying the length of certain of the bridle members.

GODFREY L. SMITH.